United States Patent
Lee et al.

(10) Patent No.: US 12,374,706 B2
(45) Date of Patent: Jul. 29, 2025

(54) NOZZLE HEATING DEVICE AND FLUID CHARGING SYSTEM

(71) Applicants: Hyundai Motor Company, Seoul (KR); Kia Corporation, Seoul (KR)

(72) Inventors: Dae Nyung Lee, Gyeonggi-do (KR); Ji Hye Park, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 606 days.

(21) Appl. No.: 17/840,283

(22) Filed: Jun. 14, 2022

(65) Prior Publication Data
US 2023/0170503 A1    Jun. 1, 2023

(30) Foreign Application Priority Data
Nov. 29, 2021 (KR) .......... 10-2021-0167570

(51) Int. Cl.
| | |
|---|---|
| *H01M 8/04* | (2016.01) |
| *H01M 8/04082* | (2016.01) |
| *H01M 8/04089* | (2016.01) |
| *H01M 8/0432* | (2016.01) |
| *H01M 8/04746* | (2016.01) |
| *H01M 8/04858* | (2016.01) |

(52) U.S. Cl.
CPC ... *H01M 8/04201* (2013.01); *H01M 8/04089* (2013.01); *H01M 8/04373* (2013.01); *H01M 8/04753* (2013.01); *H01M 8/04947* (2013.01); *H01M 2250/20* (2013.01)

(58) Field of Classification Search
CPC ......... H01M 8/04201; H01M 8/04089; H01M 8/04373; H01M 8/04753; H01M 8/04947; H01M 2250/20
USPC ........................................................ 429/513
See application file for complete search history.

(56) References Cited

U.S. PATENT DOCUMENTS

| | | | |
|---|---|---|---|
| 4,549,051 A * | 10/1985 | Ness ........................ | A61M 5/44 604/291 |
| 8,791,397 B2 | 7/2014 | Kim et al. | |
| 2006/0197254 A1* | 9/2006 | Onishi .................. | B29C 48/475 264/211.21 |
| 2012/0118878 A1 | 5/2012 | Kim et al. | |
| 2020/0318791 A1* | 10/2020 | Tsumura ................. | F17C 5/007 |

FOREIGN PATENT DOCUMENTS

| | | |
|---|---|---|
| JP | 6335356 B1 | 5/2018 |
| KR | 101189566 B1 | 10/2012 |
| KR | 101604793 B1 | 3/2016 |

* cited by examiner

*Primary Examiner* — James M Erwin
(74) *Attorney, Agent, or Firm* — Fox Rothschild LLP (57) ABSTRACT

The present disclosure relates to a nozzle heating device including a heating cover configured to cover a periphery of a nozzle configured to supply a charging fluid, and an induction heating unit disposed in the heating cover and configured to heat the nozzle by induction heating, thereby effectively inhibiting freezing of the nozzle.

19 Claims, 7 Drawing Sheets

NOZZLE HEATING DEVICE AND FLUID CHARGING SYSTEM

CROSS-REFERENCE TO RELATED APPLICATION

This application claims, under 35 U.S.C. § 119(a), priority to and the benefit of Korean Patent Application No. 10-2021-0167570 filed in the Korean Intellectual Property Office on Nov. 29, 2021, the entire contents of which are incorporated herein by reference.

BACKGROUND

Technical Field

Embodiments of the present disclosure relate to a nozzle heating device and a fluid charging system, and more particularly, to a nozzle heating device capable of effectively inhibiting a nozzle used for a hydrogen charging process from freezing.

Description of the Related Art

Fuel Cell Electric Vehicles (FCEVs) produce electrical energy from an electrochemical reaction between oxygen and hydrogen in a fuel cell stack and uses the electrical energy as a power source. FCEVs may continuously generate electricity, regardless of a capacity of a battery, by being supplied with fuel and air from the outside, and thus has high efficiency, and emits almost no contaminant. By virtue of these advantages, continuous research and development is being conducted on FCEVs.

FCEVs are equipped with a hydrogen tank, and hydrogen is stored in the hydrogen tank through a hydrogen charging line of a hydrogen storage system. The hydrogen stored in the hydrogen tank is depressurized by a regulator, supplied to the fuel cell stack along a hydrogen supply line, and then used to produce electrical energy. In addition, FCEVs are equipped with hydrogen charging receptacles as a kind of connector connected to a nozzle for supplying hydrogen gas.

However, there is a problem in the existing technologies in that the connection part between the nozzle and the receptacle (the periphery of the receptacle) is frozen because of a very low hydrogen charging temperature (e.g., −40° C. to −33° C.) during a rapid hydrogen charging process, and the freezing makes it impossible to separate the nozzle from the receptacle in a timely manner after completing the hydrogen charging process.

Therefore, recently, various types of studies have been conducted to inhibit the receptacle from freezing during the hydrogen charging process, but the study results are still insufficient. Accordingly, there is a need to develop a technology to inhibit the freezing of the receptacle during the hydrogen charging process.

SUMMARY

Embodiments of the present disclosure have been made in an effort to provide a nozzle heating device and a fluid charging system, which are configured to effectively inhibit a nozzle used for a hydrogen charging process from freezing. In particular, embodiments of the present disclosure have been made in an effort to inhibit a nozzle and a receptacle from freezing during a hydrogen charging process and easily separate the nozzle from the receptacle after completing the hydrogen charging process.

Embodiments of the present disclosure have also been made in an effort to quickly and effectively eliminate freezing of a nozzle and a receptacle and provide convenience of use.

Embodiments of the present disclosure have also been made in an effort to minimize deterioration in durability due to freezing of a nozzle and a receptacle.

Embodiments of the present disclosure have also been made in an effort to prevent overheating of a nozzle and improve safety and reliability.

The objects to be achieved by the exemplary embodiments of the present disclosure are not limited to the above-mentioned objects, but also include objects or effects that may be understood from the solutions or embodiments described below.

An exemplary embodiment of the present disclosure provides a nozzle heating device including: a heating cover configured to cover a periphery of a nozzle configured to supply a charging fluid; and an induction heating unit disposed in the heating cover and configured to heat the nozzle by induction heating. This is to effectively inhibit freezing of the nozzle used for a hydrogen charging process. That is, there is a problem in the existing technologies in that the connection part between the nozzle and the receptacle (the periphery of the receptacle) is frozen because of a very low hydrogen charging temperature (e.g., −40° C. to −33° C.) during a rapid hydrogen charging process, and the freezing makes it impossible to separate the nozzle from the receptacle in a timely manner after completing the hydrogen charging process.

In contrast, according to an exemplary embodiment of the present disclosure, the induction heating unit may be disposed to cover the periphery of the nozzle, and the nozzle may be heated by induction heating of the induction heating unit. Therefore, it is possible to obtain an advantageous effect of effectively inhibiting a connection part between the nozzle and the receptacle from freezing.

Among other things, according to an exemplary embodiment of the present disclosure, the nozzle is not indirectly heated (e.g., by thermal conduction), but the nozzle itself (i.e., the frozen part) is directly heated (by induction heating). Therefore, it is possible to obtain an advantageous effect of more quickly and effectively eliminating freezing of the connection part between the nozzle and the receptacle.

The nozzle may have various structures in accordance with required conditions and design specifications. For example, the nozzle may include: a nozzle body configured to be connected to a receptacle; a gripping unit connected to the nozzle body and configured to be selectively locked to a peripheral surface of the receptacle; and a nozzle cover configured to surround the periphery of the nozzle body, a periphery of the gripping unit, and a periphery of the receptacle. Various induction heating elements capable of heating the nozzle by induction heating may be used as the induction heating unit.

According to an exemplary embodiment of the present disclosure, the induction heating unit may include an induction heating coil configured to apply induced current to the nozzle.

According to an exemplary embodiment of the present disclosure, the nozzle heating device may include a protective layer disposed between the induction heating coil and the nozzle. Since the protective layer is disposed between the induction heating coil and the nozzle, as described above, it is possible to obtain an advantageous effect of inhibiting damage to surfaces of nozzle and the vehicle caused by contact with the induction heating coil (or the heating cover).

According to an exemplary embodiment of the present disclosure, the nozzle heating device may include: a temperature sensor configured to measure a temperature of the nozzle; and a control unit configured to selectively control power, which is to be applied to the induction heating coil, on the basis of the temperature of the nozzle measured by the temperature sensor. In particular, when the temperature of the nozzle is higher than a preset reference temperature, the control unit may be configured to cut off the supply of power to the induction heating coil.

Since the supply of power to the induction heating coil is cut off when the temperature of the nozzle is higher than the reference temperature, as described above, it is possible to inhibit overheating of the nozzle. Therefore, it is possible to obtain an advantageous effect of inhibiting damage to the nozzle and improving safety and reliability. More particularly, when a power supply time for which the power is applied to the induction heating coil exceeds a preset reference time, the control unit may be configured to cut off the supply of power to the induction heating coil.

As described above, the dual safety structure may be configured to not only control whether to supply power to the induction heating coil on the basis of the temperature of the nozzle but also to control whether to supply power to the induction heating coil on the basis of the power supply time for which the power is applied to the induction heating coil. Therefore, it is possible to obtain an advantageous effect of more effectively inhibiting overheating of the nozzle and further improving the safety and reliability.

According to an exemplary embodiment of the present disclosure, the heating cover may include: a first cover member configured to cover a part of the periphery of the nozzle; and a second cover member configured to cover a remaining other part of the periphery of the nozzle, the first and second cover members may collectively define a ring shape that surrounds the entire periphery of the nozzle, the induction heating unit may be provided in plural, and the plurality of induction heating units may be respectively disposed in the first and second cover members. In particular, the first and second cover members may be selectively separable.

Since the first and second cover members may be selectively separated from each other as described above, it is possible to obtain an advantageous effect of easily attaching or detaching the heating cover to or from the nozzle and improving the convenience of use.

According to an exemplary embodiment of the present disclosure, the nozzle heating device may include a fastening unit configured to fasten the heating cover to the nozzle.

Since the fastening unit fastens the heating cover to the nozzle as described above, it is possible to obtain an advantageous effect of inhibiting the separation of the heating cover from the nozzle and stably maintaining the effect of induction heating implemented by the induction heating unit.

Another exemplary embodiment of the present disclosure provides a fluid charging system including: a nozzle configured to be connected to a receptacle disposed in a subject, the nozzle being configured to supply a charging fluid; a heating cover configured to cover a periphery of the nozzle and a periphery of the receptacle; and an induction heating unit disposed in the heating cover and configured to heat the nozzle and the receptacle by induction heating.

According to an exemplary embodiment of the present disclosure, the induction heating unit may include an induction heating coil configured to apply induced current to the nozzle and the receptacle.

According to an exemplary embodiment of the present disclosure, the fluid charging system may include: a temperature sensor configured to measure a temperature of the nozzle; and a control unit configured to selectively control power, which is to be applied to the induction heating coil, on the basis of the temperature of the nozzle measured by the temperature sensor.

According to an exemplary embodiment of the present disclosure, the control unit may be configured to cut off a supply of power to the induction heating coil when the temperature of the nozzle is higher than a preset reference temperature.

According to an exemplary embodiment of the present disclosure, the control unit may be configured to cut off a supply of power to the induction heating coil when a power supply time for which power is applied to the induction heating coil exceeds a preset reference time.

According to an exemplary embodiment of the present disclosure, the fluid charging system may include a protective layer disposed between the induction heating coil and the nozzle.

According to an exemplary embodiment of the present disclosure, the heating cover may include: a first cover member configured to cover a part of the periphery of the nozzle; and a second cover member configured to cover the remaining other part of the periphery of the nozzle, the first and second cover members may collectively define a ring shape that surrounds the entire periphery of the nozzle, the induction heating unit may be provided in plural, and the plurality of induction heating units may be respectively disposed in the first and second cover members.

According to an exemplary embodiment of the present disclosure, the fluid charging system may include a connector configured to connect one end of the first cover member and one end of the second cover member so that the first and second cover members are rotatable, and the first and second cover members may rotate about the connector toward or away from each other.

According to an exemplary embodiment of the present disclosure, the fluid charging system may include a fastening unit configured to fasten the heating cover to the nozzle or the receptacle.

BRIEF DESCRIPTION OF THE DRAWINGS

The above and other aspects, features, and advantages of the present disclosure will be more clearly understood from the following detailed description taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. In the present specification, unless particularly stated otherwise, a singular form may also include a plural form. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. The expression "at least one (or one or more) of A, B, and C" may include one or more of all combinations that can be made by combining A, B, and C. In addition, the terms such as first, second, A, B, (a), and (b) may be used to describe constituent elements of the embodiments of the present disclosure. These terms are used only for the purpose of discriminating one constituent element from another constituent element, and the nature, the sequences, or the orders of the constituent elements are not limited by the terms.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

Hereinafter, some embodiments of the present disclosure will be described in detail with reference to the exemplary drawings. In the drawings, the same reference numerals will be used throughout to designate the same or equivalent elements. In addition, a detailed description of well-known features or functions will be ruled out in order not to unnecessarily obscure the gist of the present disclosure.

The technical spirit of the present disclosure is not limited to some embodiments described herein but may be implemented in various different forms. One or more of the constituent elements in the embodiments may be selectively combined and substituted for use within the scope of the technical spirit of the present disclosure.

In addition, unless otherwise specifically and explicitly defined and stated, the terms (including technical and scientific terms) used in the embodiments of the present disclosure may be construed as the meaning which may be commonly understood by the person with ordinary skill in the art to which the present disclosure pertains. The meanings of the commonly used terms such as the terms defined in dictionaries may be interpreted in consideration of the contextual meanings of the related technology.

In addition, the terms used in the embodiments of the present disclosure are for explaining the embodiments, not for limiting the present disclosure.

Further, when one constituent element is described as being 'connected', 'coupled', or 'attached' to another constituent element, one constituent element may be connected, coupled, or attached directly to another constituent element or connected, coupled, or attached to another constituent element through still another constituent element interposed therebetween.

In addition, the expression "one constituent element is provided or disposed above (on) or below (under) another constituent element" includes not only a case in which the two constituent elements are in direct contact with each other, but also a case in which one or more other constituent elements are provided or disposed between the two constituent elements. The expression "above (on) or below (under)" may mean a downward direction as well as an upward direction based on one constituent element.

Referring to FIGS. 1 to 7, a fluid charging system, according to an exemplary embodiment of the present disclosure includes: a nozzle 600 configured to be connected to a receptacle 100 disposed in a subject and supply a charging fluid; a heating cover 710 configured to cover a periphery of the nozzle 600 and a periphery of the receptacle 100; and an induction heating unit 720 disposed in the heating cover 710 and configured to heat the nozzle 600 and the receptacle 100 by induction heating.

For reference, the fluid charging system, according to the present disclosure, may be configured and used to charge various types of subjects with various types of charging fluids in accordance with required conditions and design specifications. The present disclosure is not restricted or limited by the type of subject and the type of charging fluid.

Further, the term 'subject' in the present disclosure is defined as including both a movable subject such as a vehicle and a non-movable subject such as a storage facility fixed to the ground.

In addition, the term 'charging fluid' in the present disclosure is defined as being any one of a gas-phase fluid and a liquid-phase fluid or including a fluid mixture made by mixing a gas-phase fluid and a liquid-phase fluid.

Hereinafter, an example will be described in which the fluid charging system, according to an exemplary embodiment of the present disclosure, is used to charge a fuel cell electric vehicle 20 (a passenger vehicle or a commercial vehicle, i.e., the subject) with hydrogen (the charging fluid).

Figure 1:
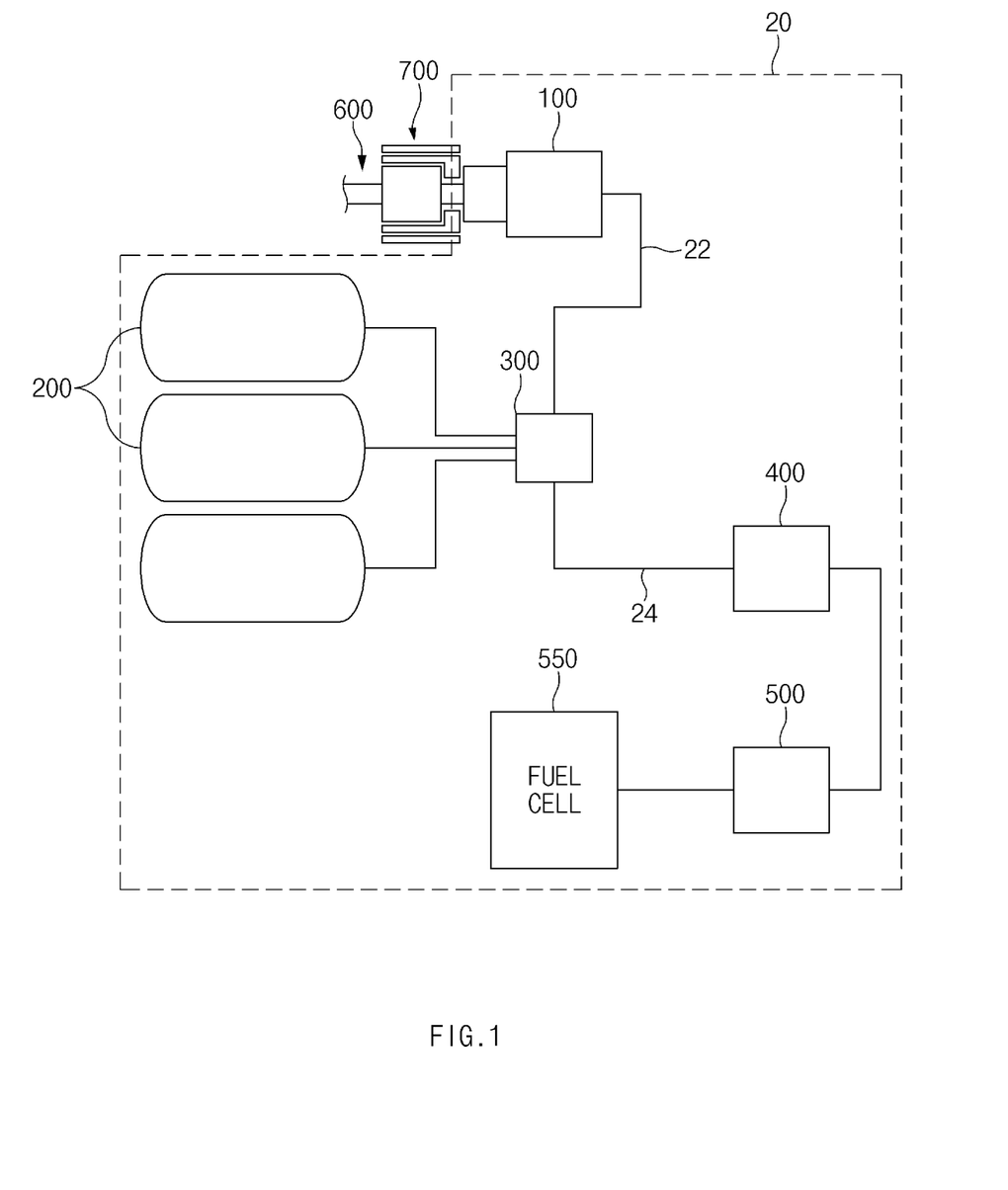
FIG. 1 is a view for explaining a fluid charging system according to an exemplary embodiment of the present disclosure.

Referring to FIG. 1, the receptacle 100 may be disposed in the fuel cell electric vehicle 20, and the nozzle 600 for supplying hydrogen may be connected to the receptacle 100.

Various types of receptacles 100, which may be connected (coupled) to the nozzle 600 with a typical coupling structure (e.g., a male-female coupling structure), may be used as the receptacle 100. The present disclosure is not restricted or limited by the type and structure of the receptacle 100. For example, the receptacle 100 may be made of a metallic material that may be heated by induction heating.

The fuel cell electric vehicle 20 is equipped with hydrogen tanks 200 for storing hydrogen, and a manifold 300 is connected to the hydrogen tanks 200.

For example, the fuel cell electric vehicle 20 may be equipped with three hydrogen tanks 200, and the manifold 300 is connected in common to the three hydrogen tanks 200. According to another exemplary embodiment of the present disclosure, the fuel cell electric vehicle may be equipped with four or more or two or less hydrogen tanks. The present disclosure is not restricted or limited by the number of hydrogen tanks and the arrangement pattern of the hydrogen tanks.

The manifold 300 may have various structures configured to divide a flow path for hydrogen. The present disclosure is not restricted or limited by the type and the structure of the manifold 300. For example, the manifold 300 may have a first port (not illustrated) connected to a hydrogen supply line 24, second to fourth ports (not illustrated) connected to the three hydrogen tanks 200, and a fifth port (not illustrated) connected to a hydrogen charging line 22.

The fuel cell electric vehicle 20 may include the hydrogen charging line 22 that connects the receptacle 100 and the manifold 300. The hydrogen, which is supplied to the receptacle 100 through the nozzle 600, is stored in the hydrogen tanks 200 via the hydrogen charging line 22 and the manifold 300.

In addition, the fuel cell electric vehicle 20 includes the hydrogen supply line 24 through which the hydrogen stored in the hydrogen tanks 200 is supplied to a fuel cell stack 550. More specifically, the hydrogen supply line 24 is configured to connect the manifold 300 and the fuel cell stack 550 disposed in the fuel cell electric vehicle 20, and the hydrogen stored in the hydrogen tanks 200 is supplied to the fuel cell stack 550 via the manifold 300 and the hydrogen supply line 24.

For reference, the fuel cell stack 550 may have various structures capable of producing electricity by means of an oxidation-reduction reaction between fuel (e.g., hydrogen) and an oxidant (e.g., air).

For example, the fuel cell stack 550 includes: a Membrane Electrode Assembly (MEA) (not illustrated) having catalyst electrode layers in which electrochemical reactions occur and which are attached to two opposite sides of an electrolyte membrane through which hydrogen ions move; a Gas Diffusion Layer (GDL) (not illustrated) configured to uniformly distribute reactant gases and transfer generated electrical energy; a gasket (not illustrated) and a fastener (not illustrated) configured to maintain leakproof sealability for the reactant gases and a coolant and maintain an appropriate fastening pressure; and a separator (bipolar plate) (not illustrated) configured to move the reactant gases and the coolant.

More specifically, in the fuel cell stack 550, hydrogen, which is fuel, and air (oxygen), which is an oxidant, are supplied to an anode and a cathode of the membrane electrode assembly, respectively, through flow paths in the separators, such that the hydrogen is supplied to the anode, and the air is supplied to the cathode.

The hydrogen supplied to the anode is decomposed into hydrogen ions (protons) and electrons by catalysts in the electrode layers provided at two opposite sides of the electrolyte membrane. Only the hydrogen ions are selectively transmitted to the cathode through the electrolyte membrane, which is a cation exchange membrane, and, at the same time, the electrons are transmitted to the cathode through the gas diffusion layer and the separator, which are conductors.

At the cathode, the hydrogen ions supplied through the electrolyte membrane and the electrons transmitted through the separator meet oxygen in the air supplied to the cathode by an air supply device, thereby creating a reaction of producing water. As a result of the movement of the hydrogen ions, the electrons flow through external conductive wires, and the electric current is generated as a result of the flow of the electrons.

In addition, the hydrogen supply line 24 may be equipped with a regulator 400 configured to depressurize hydrogen to be supplied to the fuel cell stack 550, and a hydrogen supply device (fuel processing system (FPS)) 500 configured to adjust the supply amount of hydrogen to be supplied to the fuel cell stack 550.

More specifically, the regulator 400 may be connected to the hydrogen supply line 24 and disposed between the manifold 300 and the fuel cell stack 550. The high-pressure (e.g., 700 bar) hydrogen supplied through the hydrogen supply line 24 may be supplied to the fuel cell stack 550 in a state in which the hydrogen is depressurized (e.g., 16 bar) while passing through the regulator 400.

The hydrogen supply device 500 may be connected to the hydrogen supply line 24 and disposed between the regulator 400 and the fuel cell stack 550. The hydrogen supply device 500 may be configured to adjust the supply amount of hydrogen to be supplied to the fuel cell stack 550. In addition, the supply of the hydrogen to the fuel cell stack 550 may be selectively permitted or shut off by the hydrogen supply device 500.

Figure 2:
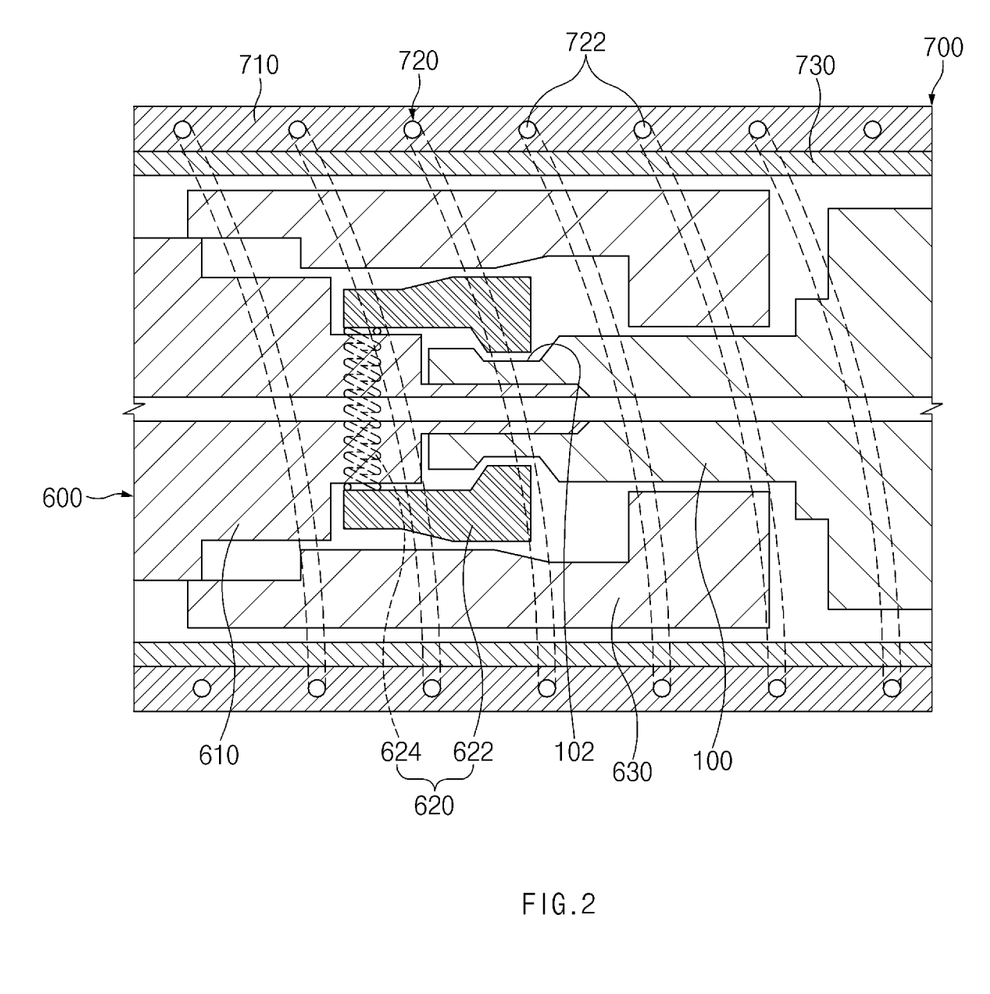
FIG. 2 is a view for explaining a nozzle heating device according to an exemplary embodiment of the present disclosure.
Figure 4:
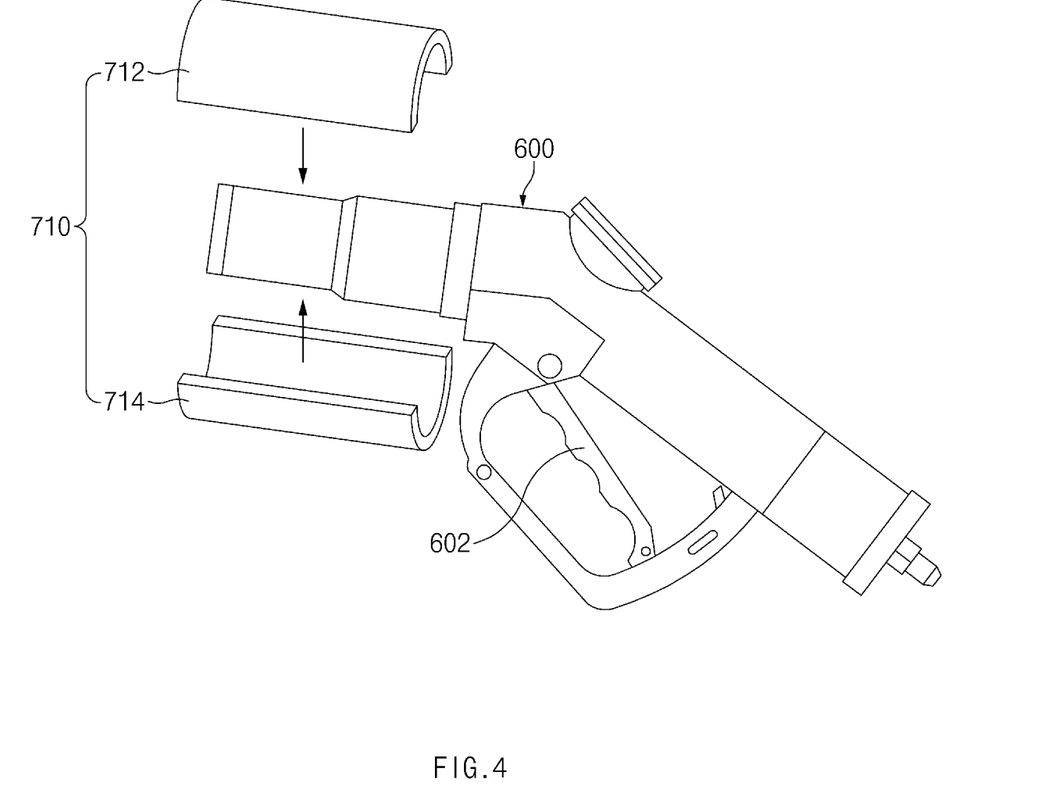
FIGS. 4 and 5 are views for explaining a modified example of a heating cover of the nozzle heating device according to an exemplary embodiment of the present disclosure.

Referring to FIGS. 2 and 4, the nozzle 600 is coupled to the receptacle 100 and is configured to supply the hydrogen (charging fluid) to the fuel cell electric vehicle 20 through the receptacle 100.

For example, the nozzle 600 may supply the fuel cell electric vehicle 20 with hydrogen stored in a charging facility (not illustrated) of a hydrogen charging station.

The nozzle 600 may have various structures capable of being selectively and separably coupled to the receptacle 100. The present disclosure is not restricted or limited by the structure and shape of the nozzle 600.

For example, the nozzle 600 may include: a nozzle body 610 configured to be connected to the receptacle 100; a gripping unit 620 connected to the nozzle body 610 and configured to be selectively locked to a peripheral surface of the receptacle 100; and a nozzle cover 630 configured to surround the periphery of the nozzle body 610, the periphery of the gripping unit 620, and the periphery of the receptacle 100.

The nozzle body 610 may be connected to the receptacle 100 by means of, e.g., a male-female coupling structure. In a state in which the nozzle body 610 is connected to the receptacle 100, the nozzle body 610 and the receptacle 100 may communicate with each other, and the hydrogen supplied through an interior of the nozzle body 610 may be introduced into the receptacle 100.

Like the receptacle 100, the nozzle 600 may be made of a metallic material that may be heated by induction heating.

The gripping unit 620 may have various structures capable of selectively locking the state in which the nozzle body 610 and the receptacle 100 are connected to each other. The present disclosure is not restricted or limited by the structure of the gripping unit 620.

For example, the gripping unit 620 may include grippers 622 rotatably connected to the nozzle body 610 and configured to be supported on the peripheral surface of the receptacle 100, and an elastic member 624 configured to elastically support the rotations of the grippers 622 relative to the nozzle body 610.

For example, the plurality of grippers 622 may be rotatably disposed on the nozzle body 610 and spaced apart from one another in a circumferential direction (a circumferential direction of the receptacle 100). The state in which the nozzle 600 and the receptacle 100 are connected to each other may be locked or unlocked as the grippers 622 are rotated in a direction in which ends of the respective grippers 622 are moved toward or away from an outer surface of the receptacle 100.

In particular, a recessed accommodation groove 102 may be formed in the peripheral surface of the receptacle 100. When the respective grippers 622 are rotated in a direction in which the respective grippers 622 approach the outer surface of the receptacle 100, the ends of the respective grippers 622 may be accommodated in the accommodation groove 102. As described above, the accommodation groove 102 may be formed in the outer peripheral surface of the receptacle 100, and the ends of the grippers 622 may be accommodated in the accommodation groove 102, such that the locked state made by the grippers 622 may be stably maintained. Therefore, it is possible to obtain an advantageous effect of more securely maintaining the state in which the nozzle 600 and the receptacle 100 are connected to each other.

A typical spring capable of elastically supporting the rotations of the grippers 622 relative to the nozzle body 610 may be used as the elastic member 624. The present disclosure is not restricted or limited by the type and structure of the elastic member 624.

For example, the elastic member 624 may be configured to provide an elastic force so that the ends of the grippers 622 are rotated to approach (be locked to) the outer surface of the receptacle 100.

An operational structure of the gripper 622 may be variously changed in accordance with required conditions and design specifications. For example, when an operating lever 602 (see FIG. 4), provided in the nozzle 600, is released, the plurality of grippers 622 are rotated away from the outer surface of the receptacle 100, such that the grippers 622 may be unlocked from the receptacle 100. In contrast, when the operation of releasing the operating lever 602 is stopped, the grippers 622 may be returned back to an initial position (a position at which the grippers 622 are rotated to be close to the outer surface of the receptacle 100) by the elastic force of the elastic member 624.

The nozzle cover 630 is configured to surround the periphery of the nozzle 600 and the periphery of the receptacle 100. The nozzle cover 630 may have various structures capable of surrounding the periphery of the nozzle 600 and the periphery of the receptacle 100. The present disclosure is not restricted or limited by the structure and shape of the nozzle cover 630.

For reference, in the present disclosure, the configuration in which the nozzle cover 630 surrounds the periphery of the nozzle 600 and the periphery of the receptacle 100 is defined as including both a configuration in which the nozzle cover 630 surrounds the entire periphery of the nozzle 600 and the entire periphery of the receptacle 100 and a configuration in which the nozzle cover 630 partially surrounds a part of the periphery of the nozzle 600 and a part of the periphery of the receptacle 100.

In particular, the nozzle cover 630 has a hollow structure (e.g., a hollow cylindrical shape) that surrounds the entire periphery of the coupling part between the nozzle 600 and the receptacle 100.

The heating cover 710 and the induction heating unit 720 constitute a nozzle heating device 700 for heating the nozzle 600. More specifically, the heating cover 710 covers the periphery of the nozzle 600 for supplying the charging fluid.

In this case, the configuration in which the heating cover 710 covers the periphery of the nozzle 600 is defined as including both a configuration in which the heating cover 710 is in close contact with a peripheral surface (outer surface) of the nozzle 600 and a configuration in which the heating cover 710 is disposed to be spaced apart from the peripheral surface (outer surface) of the nozzle 600 at a predetermined interval (e.g., an interval that enables the induction heating).

The heating cover 710 may be made of various materials and have various structures capable of surrounding the periphery of the nozzle 600. The present disclosure is not restricted or limited by the structure and material of the heating cover 710. For example, the heating cover 710 may have an approximately hollow cylindrical shape and surround the entire periphery of the nozzle 600 and the entire periphery of the receptacle 100. According to another exemplary embodiment of the present disclosure, the heating cover may partially surround the periphery of at least any one of the nozzle and the receptacle.

Hereinafter, an example will be described in which the heating cover 710 is made of a rigid material such as plastic.

According to another embodiment of the present disclosure, the heating cover may be made of a flexible material (e.g., rubber or silicone).

The induction heating unit 720 is disposed in the heating cover 710 and heats the nozzle 600 by induction heating. Various induction heating elements capable of heating the nozzle 600 by induction heating may be used as the induction heating unit 720. The present disclosure is not restricted or limited by the type and structure of the induction heating unit 720.

According to an exemplary embodiment of the present disclosure, the induction heating unit 720 may include an induction heating coil 722 configured to apply induced current to the nozzle 600.

More specifically, when power is applied to the induction heating coil 722, eddy current is generated on the nozzle 600, which is made of a conductive material (e.g., metal), by a magnetic field generated by the induction heating coil 722, and the nozzle 600 may be autonomously heated by resistance (electrical resistance) generated by the eddy current generated on the nozzle 600. In this case, a temperature of the nozzle 600 may be selectively adjusted by adjusting a frequency (adjusting a magnitude of a frequency) of power to be applied to the induction heating coil 722.

The induction heating coil 722 may have various structures in accordance with required conditions and design specifications. The present disclosure is not restricted or limited by the structure and shape of the induction heating coil 722. For example, referring to FIG. 2, the induction heating coil 722 may be formed spirally (helically) along a peripheral wall of the heating cover 710.

Figure 6:
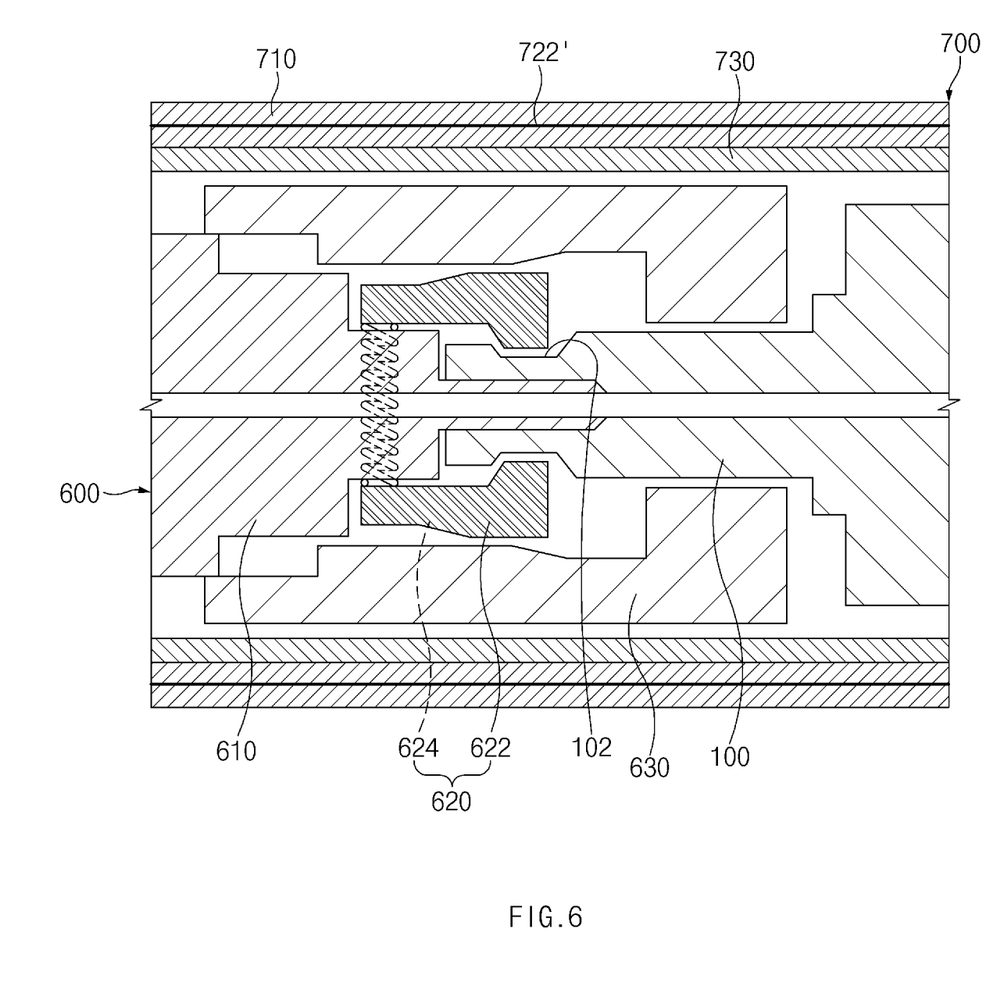
FIG. 6 is a view for explaining a modified example of an induction heating unit of the nozzle heating device according to an exemplary embodiment of the present disclosure.

Alternatively, as illustrated in FIG. 6, an induction heating coil 722' may be disposed straight in a longitudinal direction of the nozzle 600.

For reference, the supply of power to the induction heating coil 722 may be performed by means of a typical power supply line or a portable battery.

As described above, according to an exemplary embodiment of the present disclosure, the induction heating unit 720 may be disposed to cover the periphery of the nozzle 600, and the nozzle 600 may be heated by induction heating by the induction heating unit 720. Therefore, it is possible to obtain an advantageous effect of effectively inhibiting the nozzle 600 and the receptacle 100 from freezing.

Among other things, according to an exemplary embodiment of the present disclosure, the nozzle 600 is not indirectly heated (e.g., by thermal conduction), but the nozzle 600 itself (i.e., the frozen part) is directly heated (by induction heating). Therefore, it is possible to obtain an advantageous effect of more quickly and effectively eliminating freezing of the nozzle 600 and the receptacle 100.

In particular, according to an exemplary embodiment of the present disclosure, the frozen part of the nozzle 600 is heated while directly generating heat. Therefore, it is possible to obtain an advantageous effect of remarkably shortening the time required to eliminate freezing of the nozzle 600 (receptacle) in comparison with a method (thermal conduction) of eliminating freezing of the nozzle 600 by surrounding the nozzle 600 with a high-temperature hot pack or a method of eliminating freezing of the nozzle 600 by blowing hot air toward the periphery of the nozzle 600. Moreover, according to an exemplary embodiment of the present disclosure, an air compressor, a heater, and various types of valves are not required. Therefore, it is possible to obtain an advantageous effect of simplifying the structure and improving the spatial utilization and the degree of design freedom.

In addition, according to an exemplary embodiment of the present disclosure, the induction heating unit 720 is not heated, but the nozzle 600 positioned in the induction heating unit 720 (heating cover) is heated by induction heating. Therefore, it is possible to prevent an accident (burn accident) due to overheating of the induction heating unit 720 even though a user's body comes into contact with the induction heating unit 720 (heating cover).

According to an exemplary embodiment of the present disclosure, the nozzle heating device 700 may include a protective layer 730 disposed between the induction heating coil 722 and the nozzle 600. For example, the protective layer 730 may be disposed on an inner surface of the heating cover 710 (the surface facing an outer surface of the nozzle 600) so as to cover the induction heating coil 722.

A sponge or woven fabric may be used as the protective layer 730. The present disclosure is not restricted or limited by the type and properties of the protective layer 730.

Since the protective layer 730 is disposed between the induction heating coil 722 and the nozzle 600, as described above, it is possible to obtain an advantageous effect of inhibiting damage to surfaces of nozzle 600 and the vehicle caused by contact with the induction heating coil (or the heating cover).

Figure 3:
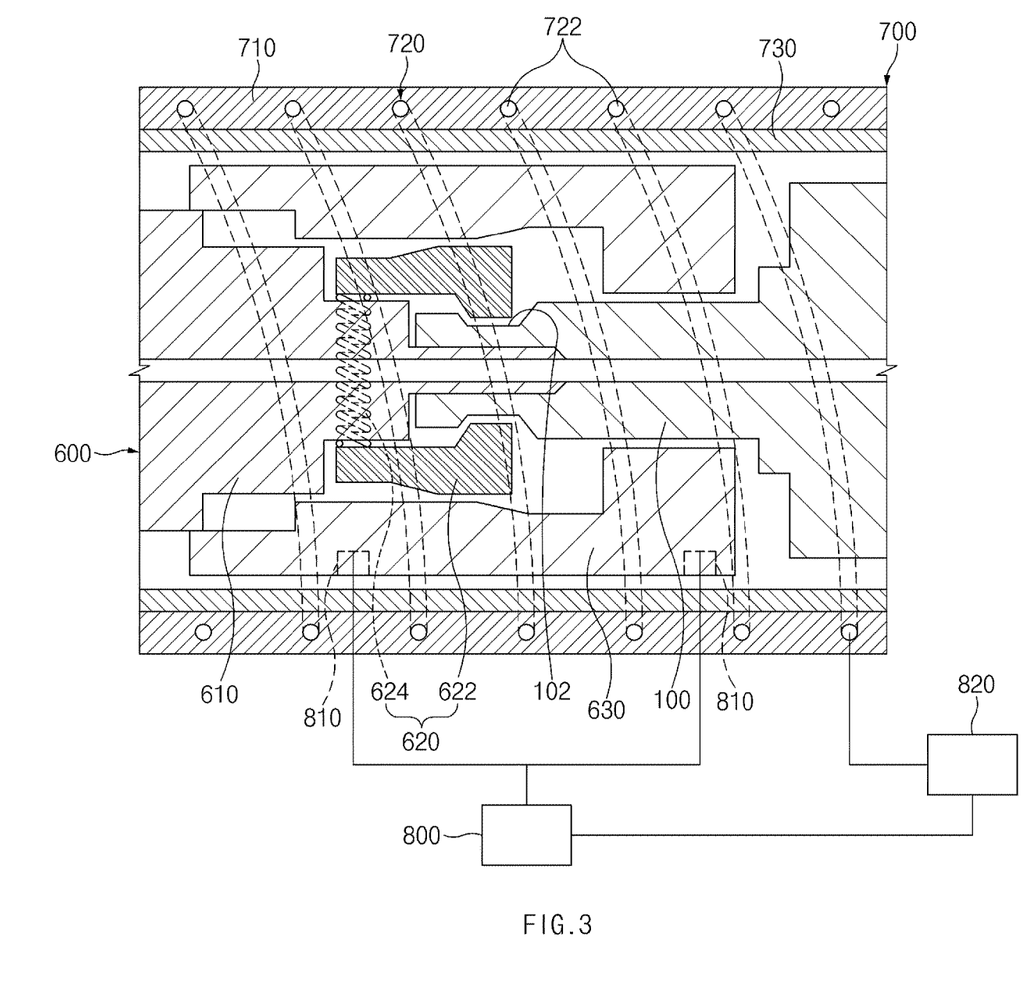
FIG. 3 is a view for explaining a control unit of the nozzle heating device according to an exemplary embodiment of the present disclosure.

Referring to FIG. 3, the nozzle heating device 700, according to an exemplary embodiment of the present disclosure, may include: temperature sensors 810 configured to measure a temperature of the nozzle 600, and a control unit 800 configured to selectively control power, which is to be applied to the induction heating coil 722, on the basis of the temperature of the nozzle 600 measured by the temperature sensors 810.

A typical sensor (e.g., a contact sensor or a contactless sensor) capable of detecting the temperature of the nozzle 600 may be used as the temperature sensor 810. The present disclosure is not restricted or limited by the type and sensing methods of the temperature sensor 810. In particular, the temperature sensor 810 may be provided in plural, and the plurality of temperature sensors 810 may be disposed to be spaced apart from one another to improve accuracy in measuring the temperature of the nozzle 600.

The control unit 800 may be configured to control the power, which is to be applied to the induction heating coil 722, on the basis of the temperature of the nozzle 600 detected by the temperature sensor 810. In this case, the configuration in which the power to be applied to the induction heating coil 722 is controlled may mean that the power to be applied to the induction heating coil 722 by a power supply unit 820 is turned on or off.

The control unit 800 may be a central processing unit (CPU) or a semiconductor device that processes instructions stored in a memory and/or a storage. Examples of the memory and the storage may include various types of volatile or non-volatile storage media. Examples of the memory may include a read only memory (ROM) and a random-access memory (RAM).

In particular, when the temperature of the nozzle 600 is higher than a preset reference temperature, the control unit 800 may be configured to cut off the supply of power to the induction heating coil 722.

For example, the reference temperature may be defined as 40° C. When the temperature of the nozzle 600 (e.g., a surface of the nozzle), measured by the temperature sensor 810, exceeds 40° C., the control unit 800 may be configured to cut off the supply of power to the induction heating coil 722. The operation of heating the nozzle 600 by induction heating may be stopped in the state in which the supply of power to the induction heating coil 722 is cut off.

Since the supply of power to the induction heating coil 722 is cut off when the temperature of the nozzle 600 is higher than the reference temperature, as described above, it is possible to inhibit overheating of the nozzle 600. Therefore, it is possible to obtain an advantageous effect of inhibiting damage to the nozzle 600 and improving safety and reliability.

More particularly, when a power supply time for which the power is applied to the induction heating coil 722 exceeds a preset reference time, the control unit 800 may be configured to cut off the supply of power to the induction heating coil 722.

For example, the reference time may be defined as 10 seconds. When the power supply time for which the power is applied to the induction heating coil 722 exceeds 10 seconds, the control unit 800 may be configured to cut off the supply of power to the induction heating coil 722. In a case in which the nozzle 600 needs to be additionally heated, a power supply switch (not illustrated) may be manipulated again so that power is supplied to the induction heating coil 722 for every 10 seconds.

As described above, the dual safety structure may not only control whether to supply power to the induction heating coil 722 on the basis of the temperature of the nozzle 600, but also control whether to supply power to the induction heating coil 722 on the basis of the power supply time for which the power is applied to the induction heating coil 722. Therefore, it is possible to obtain an advantageous effect of more effectively inhibiting overheating of the nozzle 600 and further improving the safety and reliability.

According to an exemplary embodiment of the present disclosure, the supply of power to the induction heating coil 722 (the operation of heating the nozzle by induction heating) may be performed in the state in which the hydrogen charging process is completed (the flow of hydrogen in the nozzle is blocked) in consideration of anti-explosion safety.

In an exemplary embodiment of the present disclosure, illustrated and described above, the example has been described in which the heating cover 710 is configured as only a single cover member. However, according to another embodiment of the present disclosure, a plurality of cover members may be used to constitute the heating cover.

Referring to FIG. 4, the heating cover 710 may include a first cover member 712 configured to cover a part of the periphery of the nozzle 600, and a second cover member 714 configured to cover a remaining other part of the periphery of the nozzle 600, and the first and second cover members 712 and 714 collectively define a ring shape that surrounds the entire periphery of the nozzle 600. The induction heating units 720 may be respectively disposed in the first and second cover members 712 and 714.

Hereinafter, an example will be described in which the heating cover 710 includes the two cover members (the first cover member and the second cover member). According to another embodiment of the present disclosure, the heating cover may include three or more cover members.

For example, the first and second cover members 712 and 714 may each have an approximately semicircular shape. The first and second cover members 712 and 714 may be coupled to each other to collectively define a ring shape that surrounds the entire periphery of the nozzle 600.

In particular, the first and second cover members 712 and 714 may be selectively separable. In this case, the configuration in which the first and second cover members 712 and 714 are selectively separable may mean that the first and second cover members 712 and 714 may be selectively coupled to and separated from each other with respect to the nozzle 600.

Since the first and second cover members 712 and 714 may be selectively separated from each other, as described above, it is possible to obtain an advantageous effect of easily attaching or detaching the heating cover 710 to or from the nozzle 600 and improving the convenience of use.

For reference, a typical fastening member may lock the state in which the first and second cover members 712 and 714 are coupled to each other (the state in which the first and second cover members 712 and 714 are coupled to define a ring shape). The present disclosure is not restricted or limited by the type and structure of the fastening member configured to lock the state in which the first and second cover members 712 and 714 are coupled to each other.

Figure 5:
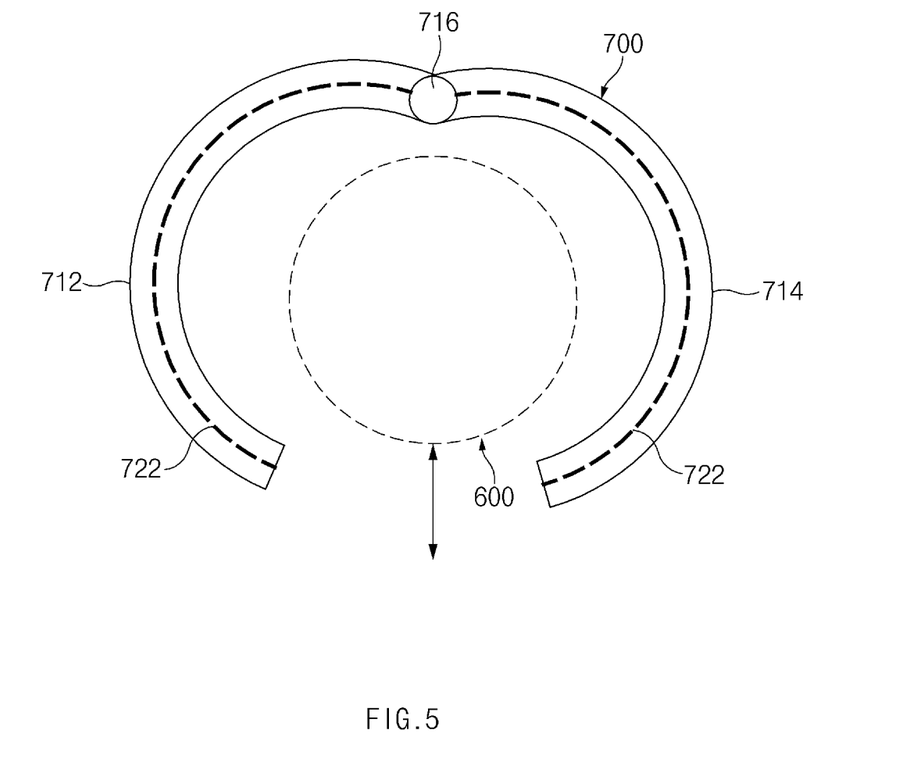

According to an exemplary embodiment of the present disclosure, the heating cover 710 includes the first cover member 712, the second cover member 714, and a connector 716 configured to connect one end of the first cover member 712 and one end of the second cover member 714 so that the first and second cover members 712 and 714 are rotatable. Therefore, the heating cover 710 may have a structure provided in the form of a kind of clothespins, and the first and second cover members 712 and 714 may rotate about the connector 716 toward or away from each other.

When the first and second cover members 712 and 714 rotate about the connector 716, away from each other, an interval between the first and second cover members 712 and 714 increases, which makes it possible to allow the nozzle 600 to move inward or outward between the first and second cover members 712 and 714. In particular, an elastic member (not illustrated) such as a spring may elastically support the rotations of the first and second cover members 712 and 714 about the connector 716.

In an exemplary embodiment of the present disclosure, illustrated and described above, the example has been described in which the heating cover 710 is provided in the form of a rigid ring. However, according to another embodiment of the present disclosure, the heating cover may be provided in the form of a pack or belt that may be wound around the nozzle.

Figure 7:
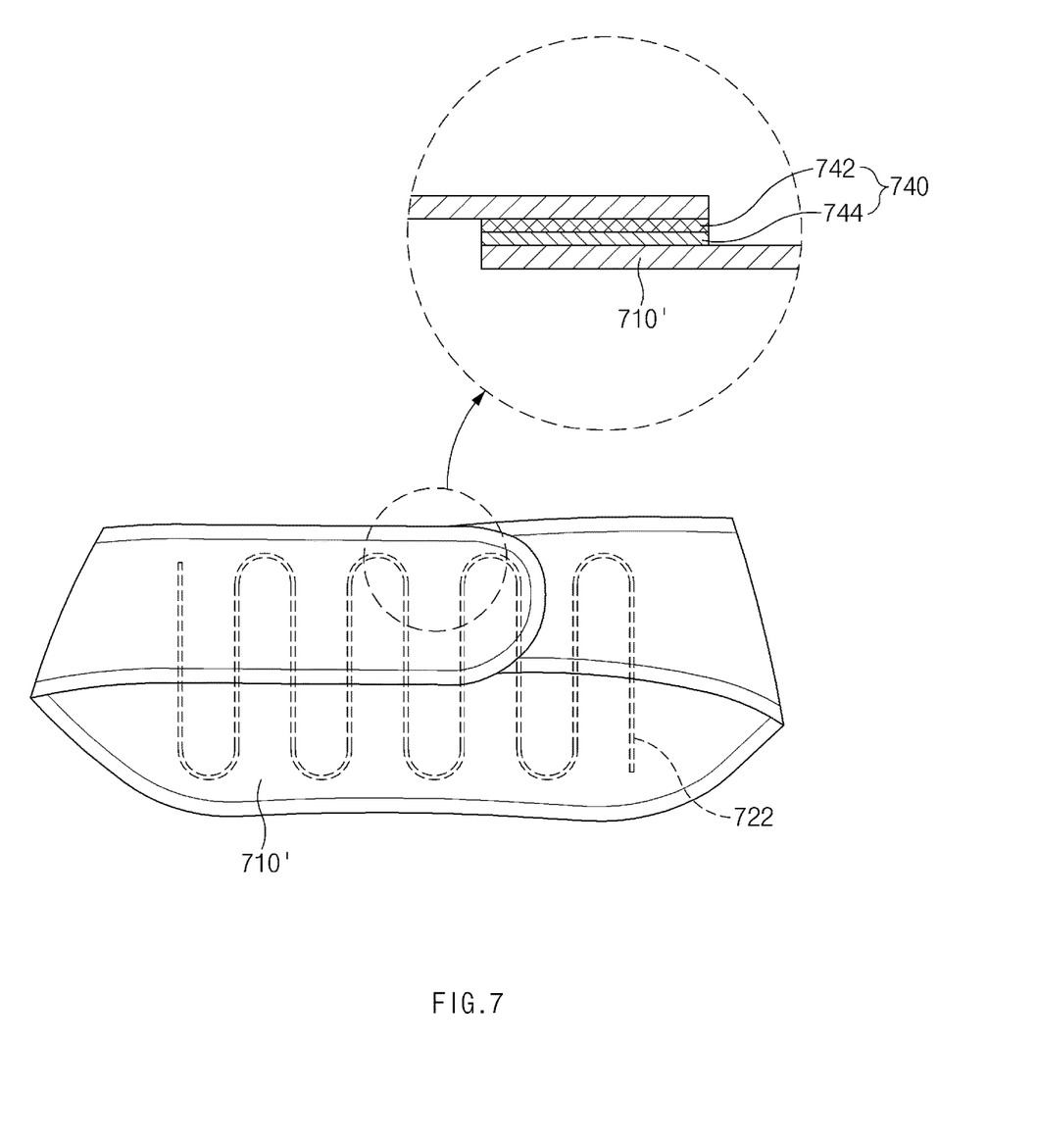
FIG. 7 is a view for explaining a fastening unit of the nozzle heating device according to an exemplary embodiment of the present disclosure.

Referring to FIG. 7, a heating cover 710' may be provided in the form of a flat pack that may surround the periphery of the nozzle 600, and the induction heating coil 722 may be disposed in an approximately zigzag manner in the heating cover 710'.

In particular, the nozzle heating device 700 may include a fastening unit 740 configured to fasten the heating cover 710' to the nozzle 600.

Various types of fastening members capable of fastening the heating cover 710', which is disposed to surround the periphery of the nozzle 600, to the nozzle 600 may be used as the fastening unit 740. The present disclosure is not restricted or limited by the type and structure of the fastening unit 740.

For example, the fastening unit 740 may include a first Velcro part 742 (e.g., a hook part) disposed at one end of the heating cover 710', and a second Velcro part 744 (e.g., a loop part) disposed at the other end of the heating cover 710' and configured to be attached to the first Velcro part 742.

According to another exemplary embodiment of the present disclosure, an elastic band (e.g., a ring-shaped elastic band) or other members may be used to constitute the fastening unit.

Since the heating cover 710' is fastened to the nozzle 600 by means of the fastening unit 740, as described above, it is possible to obtain an advantageous effect of inhibiting the separation of the heating cover 710 from the nozzle 600 and stably maintaining the effect of induction heating implemented by the induction heating unit 720.

According to an exemplary embodiment of the present disclosure, described above, it is possible to obtain an advantageous effect of effectively inhibiting freezing of the nozzle used for the hydrogen charging process.

In particular, according to an exemplary embodiment of the present disclosure, it is possible to obtain an advantageous effect of inhibiting freezing of the nozzle and the receptacle during the hydrogen charging process and easily separating the nozzle from the receptacle after completing the hydrogen charging process.

In addition, according to an exemplary embodiment of the present disclosure, it is possible to obtain an advantageous effect of quickly and effectively eliminating freezing of the nozzle and the receptacle and providing the convenience of use.

In addition, according to an exemplary embodiment of the present disclosure, it is possible to obtain an advantageous effect of minimizing the deterioration in durability due to freezing of the nozzle and the receptacle.

In addition, according to an exemplary embodiment of the present disclosure, it is possible to obtain an advantageous effect of preventing overheating of the nozzle and improving safety and reliability.

While the embodiments have been described above, the embodiments are just illustrative and not intended to limit the present disclosure. It can be appreciated by those skilled in the art that various modifications and applications, which are not described above, may be made to the present embodiment without departing from the intrinsic features of the present embodiment. For example, the respective constituent elements specifically described in the embodiments may be modified and then carried out. Further, it should be interpreted that the differences related to the modifications and applications are included in the scope of the present disclosure defined by the appended claims.

What is claimed is:

1. A nozzle heating device comprising:
a heating cover configured to cover a periphery of a nozzle configured to supply a charging fluid; and
an induction heating unit disposed in the heating cover and configured to heat the nozzle by induction heating;
wherein the heating cover comprises:
a first cover member configured to cover a part of the periphery of the nozzle; and
a second cover member configured to cover a remaining other part of the periphery of the nozzle,
wherein the first and second cover members collectively define a ring shape that surrounds the entire periphery of the nozzle,
wherein the induction heating unit is provided in plural, and
wherein the plurality of induction heating units are respectively disposed in the first and second cover members.

2. The nozzle heating device of claim 1, wherein the induction heating unit comprises an induction heating coil configured to apply induced current to the nozzle.

3. The nozzle heating device of claim 2, comprising:
a temperature sensor configured to measure a temperature of the nozzle; and
a control unit configured to selectively control power, which is to be applied to the induction heating coil, on a basis of the temperature of the nozzle measured by the temperature sensor.

4. The nozzle heating device of claim 3, wherein the control unit is configured to cut off a supply of power to the induction heating coil when the temperature of the nozzle is higher than a preset reference temperature.

5. The nozzle heating device of claim 3, wherein the control unit is configured to cut off a supply of power to the induction heating coil when a power supply time for which power is applied to the induction heating coil exceeds a preset reference time.

6. The nozzle heating device of claim 2, comprising a protective layer disposed between the induction heating coil and the nozzle.

7. The nozzle heating device of claim 1, wherein the first and second cover members are selectively separable.

8. The nozzle heating device of claim 1, further comprising a connector configured to connect one end of the first cover member and one end of the second cover member such that the first and second cover members are rotatable,
wherein the first and second cover members are configured to rotate about the connector toward or away from each other.

9. The nozzle heating device of claim 1, further comprising a fastening unit configured to fasten the heating cover to the nozzle.

10. A nozzle heating device comprising:
a heating cover configured to cover a periphery of a nozzle configured to supply a charging fluid; and
an induction heating unit disposed in the heating cover and configured to heat the nozzle by induction heating,
wherein the nozzle comprises:
a nozzle body configured to be connected to a receptacle disposed in a subject;
a gripping unit connected to the nozzle body and configured to be selectively locked to a peripheral surface of the receptacle; and
a nozzle cover configured to surround the periphery of the nozzle body, a periphery of the gripping unit, and a periphery of the receptacle.

11. A fluid charging system comprising:
a nozzle configured to be connected to a receptacle disposed in a subject, the nozzle being configured to supply a charging fluid;
a heating cover configured to cover a periphery of the nozzle and a periphery of the receptacle; and
an induction heating unit disposed in the heating cover and configured to heat the nozzle and the receptacle by induction heating.

12. The fluid charging system of claim 11, wherein the induction heating unit comprises an induction heating coil configured to apply induced current to the nozzle and the receptacle.

13. The fluid charging system of claim 12, further comprising:
a temperature sensor configured to measure a temperature of the nozzle; and
a control unit configured to selectively control power, which is to be applied to the induction heating coil, on a basis of the temperature of the nozzle measured by the temperature sensor.

14. The fluid charging system of claim 13, wherein the control unit is configured to cut off a supply of power to the induction heating coil when the temperature of the nozzle is higher than a preset reference temperature.

15. The fluid charging system of claim 13, wherein the control unit is configured to cut off a supply of power to the induction heating coil when a power supply time for which power is applied to the induction heating coil exceeds a preset reference time.

16. The fluid charging system of claim 12, further comprising a protective layer disposed between the induction heating coil and the nozzle.

17. The fluid charging system of claim 11, wherein the heating cover comprises:
- a first cover member configured to cover a part of a periphery of the nozzle; and
- a second cover member configured to cover a remaining other part of the periphery of the nozzle, wherein:
- the first and second cover members collectively define a ring shape that surrounds the entire periphery of the nozzle,
- the induction heating unit is provided in plural, and
- the plurality of induction heating units is respectively disposed in the first and second cover members.

18. The fluid charging system of claim 17, further comprising a connector configured to connect one end of the first cover member and one end of the second cover member such that the first and second cover members are rotatable,
wherein the first and second cover members rotate about the connector toward or away from each other.

19. The fluid charging system of claim 11, further comprising a fastening unit configured to fasten the heating cover to the nozzle or the receptacle.

* * * * *